United States Patent [19]

Burgess et al.

[11] Patent Number: 5,329,621
[45] Date of Patent: Jul. 12, 1994

[54] MICROPROCESSOR WHICH OPTIMIZES BUS UTILIZATION BASED UPON BUS SPEED

[75] Inventors: Bradley G. Burgess; James B. Eifert; Michael S. Taborn, all of Austin, Tex.

[73] Assignee: Motorola, Inc., Schaumburg, Ill.

[21] Appl. No.: 425,082

[22] Filed: Oct. 23, 1989

[51] Int. Cl.⁵ .............................................. G06F 9/28
[52] U.S. Cl. ................................... 395/325; 395/375; 364/DIG. 1; 364/240.5; 364/262.4; 364/263.1; 364/271.9
[58] Field of Search ................................ 395/325, 375

[56] References Cited

U.S. PATENT DOCUMENTS

| | | | |
|---|---|---|---|
| 4,298,927 | 11/1981 | Berglund et al. | 395/375 |
| 4,344,132 | 8/1982 | Dixon et al. | 395/250 |
| 4,633,437 | 12/1986 | Mothersole et al. | 395/250 |
| 4,701,842 | 10/1987 | Olnowich | 395/375 |
| 4,710,866 | 12/1987 | Zolnowsky et al. | 395/375 |
| 4,729,093 | 3/1988 | Mothersole et al. | 395/375 |
| 4,742,451 | 5/1988 | Bruckert et al. | 395/375 |
| 4,763,253 | 9/1988 | Bluhm et al. | 395/375 |

OTHER PUBLICATIONS

Branch Folding in the CRISP Microprocessor: Reducing Brach Delay to Zero, by David R. Ditzel and Hubert R. McLellan, 1987 ACM0084-7495/87/06000, pp. 2-9.

An Evaluation of Brach Architectures, by John A. DeRosa and Henry M. Levy, 1987 ACM 0084-7495/87/0600, pp. 10-16.

Primary Examiner—Debra A. Chun
Attorney, Agent, or Firm—Jonathan P. Meyer

[57] ABSTRACT

A data processing apparatus having a bus speed counter for determining the bus speed of a previous bus cycle. This previous bus speed information is then used to optimize bus utilization. This bus speed information is particularly useful for determining whether to run prefetch bus cycles during the execution of a conditional branch instruction. If previous bus cycles have been slow, prefetch procrastination can occurs until the branch condition resolves.

3 Claims, 5 Drawing Sheets

MICROPROCESSOR WHICH OPTIMIZES BUS UTILIZATION BASED UPON BUS SPEED

FIELD OF THE INVENTION

This invention relates to microprocessors which have a conditional change of flow capability, and more particularly to microprocessors which at a change of flow condition, alter instruction prefetching based upon the speed of the previous instruction prefetch bus cycle.

BACKGROUND OF THE INVENTION

Microprocessors typically have the capacity to make instruction prefetch requests before the instruction being prefetched is actually needed by the microprocessor. These requests are held pending until such time as the instruction can be obtained, typically from external memory. Once an instruction is obtained, it is held in an instruction pipe to await execution. Microprocessors will sometimes execute a change of flow, also called a branch. A typical non-branching instruction assumes that the next instruction to be executed is located at the next sequential address following itself. A branch instruction, on the other hand, specifies the address of the next instruction to be executed, and it is not typically the next sequential address following the branch. A type of branch instruction, the conditional branch, branches based upon a specified condition. If the condition is true, the address of the next instruction to be executed is that specified by the conditional branch instruction. If the condition is false, the next instruction to be executed is assumed to be located at the next sequential address following the conditional branch instruction. The address specified by the branch instruction is referred to as the "branch destination". In a conditional branch, when the specified condition is true and a branch occurs it is referred to as a "branch taken". When the condition is false and the branch is not taken it is referred to as a "fall through", since the instruction execution simply "falls through" to the instruction at the next sequential address following the branch instruction.

Modern processors are also typically pipelined so that the sequence of steps associated with performing an instruction; such as prefetch, decode, and execution, overlap in time with the adjacent steps of preceding instructions. For example a sequence of instructions A,B,C might pipeline within a processor such that while A is executing, B is being decoded and C is being prefetched. As a result of the overlap, the effective execution time of an instruction is less than the sum of its prefetch, decode and execute times. In most pipelined processors, prefetches are performed assuming that no branch will occur. This assumption allows instructions to be easily prefetched and decoded in advance of when they are needed, since the next address to prefetch is simply an increment of the previously prefetched address. When a branch occurs in a pipelined processor, any prefetched instructions are invalidated (or flushed) and prefetching restarts at the branch destination address. Since the pipeline has been flushed, the first instruction cannot overlap its prefetch and decode time with that of any previous instructions, and thus there is a delay associated with executing the first instruction following a branch. This delay associated with pipelining is often referred to as the "branch penalty" and effects both conditional and unconditional branches.

In addition to the branch penalty, there can be a delay associated with stopping the prefetching of the fall through instruction path and starting the prefetch of the branch taken path. Typically there is a period of time between detecting a branch instruction and starting the prefetch for the branch destination. If an unnecessary prefetch were to be started and take longer than this period of time, it would needlessly delay the prefetch of the branch taken path. For the unconditional branch case, the instruction decode can be used to detect the branch and stop prefetch requests early in the instruction. For the conditional branch case the correct decision of whether to stop prefetch requests can not be made until after the specified condition test has been resolved. If the branch resolves to a fall through case, the best decision would to have been to allow the prefetch. If the branch resolves to a branch taken case, the best decision would have been to not run the unnecessary prefetch.

In general there have been several schemes suggested for helping to reduce branch delay. Such methods have involved detecting the branch as early as possible and attempting to predict whether the branch will be taken or will fall through. These schemes have included;

1) explicitly specifying within a field of the branch instruction whether to anticipate a branch taken or the fall through,
2) associating different conditional branch test conditions with their tendency to be executed more often as branch taken or as fall through,
3) prefetching both the branch taken and fall through paths, and
4) associating the branch forward or backward direction with their tendency to be executed more often as branch taken or as fall through.

SUMMARY OF THE INVENTION

Accordingly, it is an object of the present invention to provide an integrated circuit microprocessor with improved performance.

This and other objects and advantages of the present invention are provided by an integrated circuit microprocessor comprising: an instruction execution and sequencing means, a bus control means coupled to the instruction execution and sequencing means and also coupled to a communications bus, and a bus speed determination means for determining the time required to complete a previously completed bus cycle of said communications bus.

DETAILED DESCRIPTION OF THE INVENTION

The terms "assert" and "negate", and various grammatical forms thereof, are used herein to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

Figure 1:
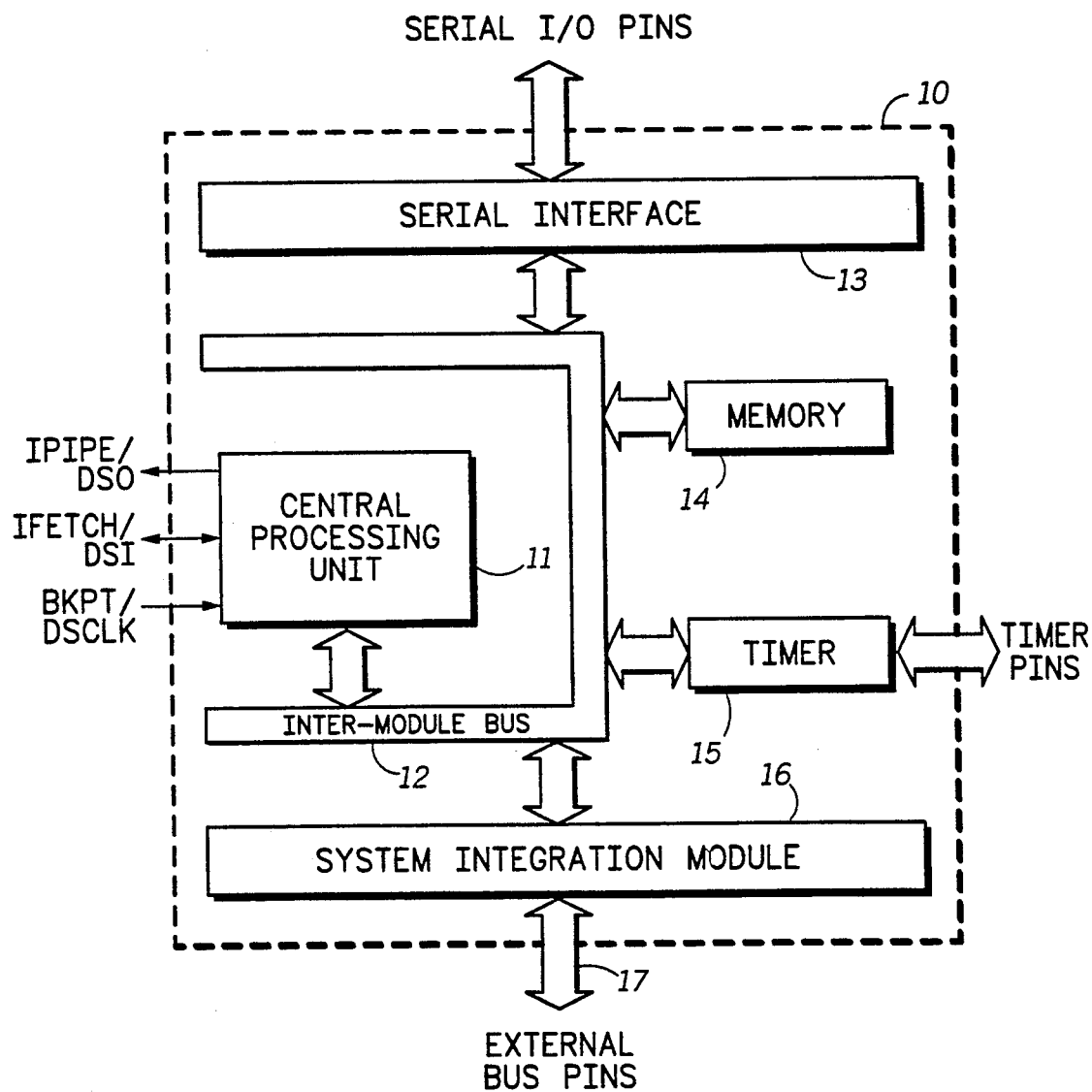
FIG. 1 is a block diagram of an integrated circuit microprocessor of a particular embodiment of the present invention.

FIG. 1 illustrates a microprocessor of which a preferred embodiment of the present invention is a part. Microprocessor 10, which is intended for manufacture as a single integrated circuit, comprises a central processing unit (CPU) 11, an inter-module bus (IMB) 12, a serial interface 13, a memory module 14, a timer 15 and a system integration module (SIM) 16. Each of CPU 11, serial interface 13, memory 14, timer 15 and SIM 16 is bi-directionally coupled to IMB 12 for the purpose of exchanging address, data and control information.

Serial interface 13 and timer 15 are each coupled to a number of pins, or connectors, for communication with devices external to microprocessor 10. In addition, SIM 16 is coupled to a number of pins comprising an external bus and to power supply and crystal oscillator pins. SIM 16 provides a means for interfacing the IMB 12 to the external bus 17 so that the CPU 11 can access external memory or peripheral devices.

The IMB generally consists of a 16-bit data bus, a 24-bit address bus and additional associated control lines. For this device; byte refers to an 8-bit quantity, word refers to a 16-bit quantity, and long refers to a 32-bit quantity of data. A long transfer across the IMB 12 requires that two bus cycles be run.

Figure 2:
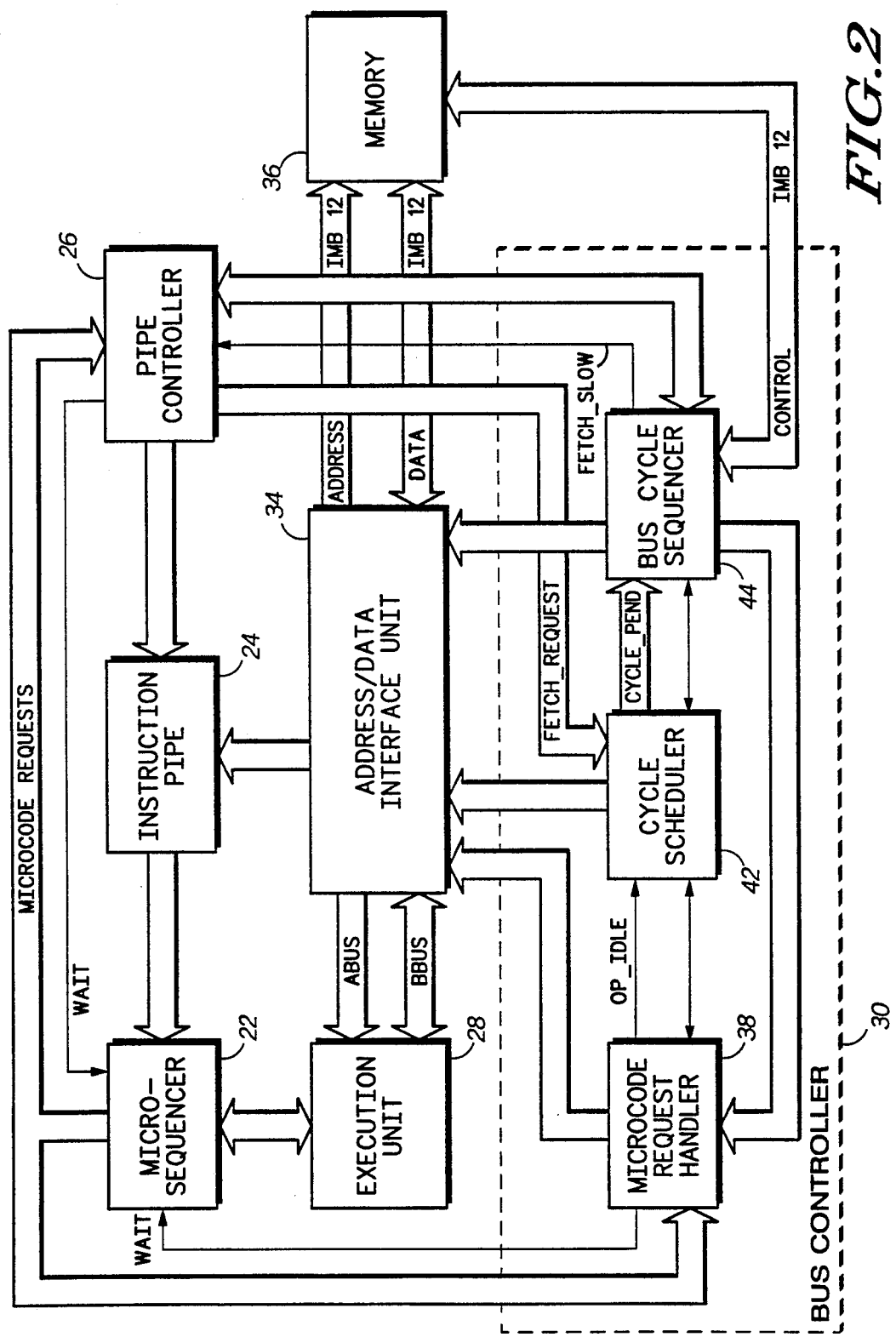
FIG. 2 is a block diagram of the central processor unit (CPU) of FIG. 1 of the microprocessor of the particular embodiment of the present invention.

As shown in FIG. 2, the CPU 11 is comprised generally of an execution unit 28, a microsequencer 22, an instruction pipe 24, a pipe controller 26, an address/data interface unit 34, and a bus controller 30. Also shown in FIG. 2, is a memory which is external to the CPU 11. This memory could exist within the microcontroller 10 and be coupled to the CPU 11 by the IMB 12 (e.g. memory 14), or the memory could reside external to the microcontroller and be coupled to the CPU 11 by the external bus 17, SIM 16, and IMB 12.

The operations of the CPU 11 are synchronized by internal clocks. These include the PHI1 and PHI2 clocks which are complements of each other, and the T1, T2, T3, and T4 clocks which occur sequentially. A clock is said to occur or to be in being when it is a logic high. During a certain PHI1, T1 is in being. During the next following PHI2, T2 is in being. During the next following PHI1, T3 is in being, and during the next following PHI2, T4 is in being. During the following PHI1, T1 is once again in being. Another time period of significance which sometimes occurs is referred to as T4bar. This occurs when T1-T4 are suspended. For time equal to PHI1, none of the clocks T1-T3 occur. A T4 always follows T4bar. Suspension of the clocks can be referred to as T4/T4bar. The bus controller 30, the pipe controller 26, and sections of the microsequencer 22 have the ability to suspend the internal time clocks, that is, put them into a T4—T4bar—T4—T4bar, etc. sequence. This clocking sequence is necessary, for example, whenever a bus cycle has been requested by the microcode, and the data from the requested bus cycle is needed to proceed but is not yet available. Another example occurs when the microsequencer 22 is requesting a word from the instruction pipe 24 that has yet to be fetched.

The execution unit 28 executes an instruction as dictated by the microinstructions from the microsequencer 22. The execution unit 28 generally contains registers, an arithmetic logic unit (ALU), a shifter, and interconnecting buses.

The address/data interface unit 34 can be thought of as an execution unit, under the direction of the bus controller 30, that performs the address and data operations necessary for running bus cycles. The address/data unit 34 contains an address output buffer (AOB) and a data buffer (DBUF). The AOB provides the address for the bus cycle, and the data register either provides data during a write bus cycle, or latches data during a read bus cycle. Other components of the address/data interface unit 34 include address registers used for enqueueing bus cycles (ADRTs), program counters (PCs) used for prefetching and in the calculation of branch addresses, and an incrementer for incrementing addresses. Two buses, ABUS and BBUS, couple the address/data interface unit 34 with the execution unit 28.

The bus controller 30 is the unit responsible for running all IMB bus cycles. The bus controller 30 is comprised of three sections, the request handler 38 which interfaces to the microsequencer 22, the cycle scheduler 42 which schedules and sets up the bus cycles, and the bus cycle sequencer 44 which runs the bus cycles thus interfacing to the IMB 12. The microsequencer 22 transfers an address, and for a write case data, to the address/data interface unit 34 and requests that a bus cycle be run. The request handler 38 controls access to the registers within the address/data interface unit 34. When the microsequencer 22 attempts to access a register within the unit, the register may be involved in running a previously enqueued bus cycle and thus be unavailable. In this case, the request handler 38 signals the microsequencer 22 to stop its clocks and wait until the requested register becomes available. Table I shows the microcode commands handled by the request handler 38 and identifies those commands that can cause wait states. A bus cycle can be started immediately, or if resources are unavailable (i.e. due to another master using the bus or a prefetch is being run) the cycle is enqueued. Operands, which refer to data bus accesses, and branches are initiated by microcode command and are handled by the request handler 38. The request handler 38, in turn, requests that its operand or branch be scheduled by the cycle scheduler 42. Routine sequential prefetches are scheduled independently by the cycle sequencer which also takes prefetch requests from the pipe controller 26.

TABLE I

Microcode request to the Bus Controller

REGISTER ACCESS REQUESTS
transfer register PCA onto ABUS during T1
transfer register PCC onto ABUS during T1
transfer the value on ABUS into register PCC during T1
transfer the value on BBUS into register ADRT during T1**
transfer register DBUF onto BBUS at T1**
transfer the value on BBUS into register ADRT at T3**
transfer the value on BBUS into register DBUF at T3**
INITIATE A BUS CYCLE (specifying Type, When, and Size)
Cycle Type-
    IACK - Interrupt Acknowledge Cycle,
    BRANCH - Prefetch starting with ADRT address
    READ - a normal read cycle
    WRITE - a normal write cycle

TABLE I-continued

Microcode request to the Bus Controller

RMC_READ - Assert the RMC line and perform a read
RMC_WRITE - Perform a write and negate the RMC line
When - T1, T3, Previous T3
Size - Byte, Word, Long
MISC. COMMANDS
Assert the RESET line
Assert the HALT line
Assert the FREEZE line
Negate th FREEZE line
SYNC - stop the microcontroller until all
       operand bus cycles complete.**
Signal Pipe to enter LOOP MODE
Signal Pipe to exit LOOP MODE

**These Commands can cause wait states.

The microcode request handler 38 requests, via the OP_IDLE signal, that the cycle scheduler 42 run operand bus cycles. This signal is asserted if an operand is enqueued, or if an operand will be enqueued within the next clock cycle. This signal is also implemented such that operands have a higher priority than prefetches. With this in mind, if a operand is to be enqueued T1, the T4 generation of the OP_IDLE signal must be qualified with the clock wait signals. Otherwise, if the wait is caused by pipe controller 26 needing a prefetch to be run, and the operand cannot be run till T1, then a deadlock situation would result.

Figure 3:
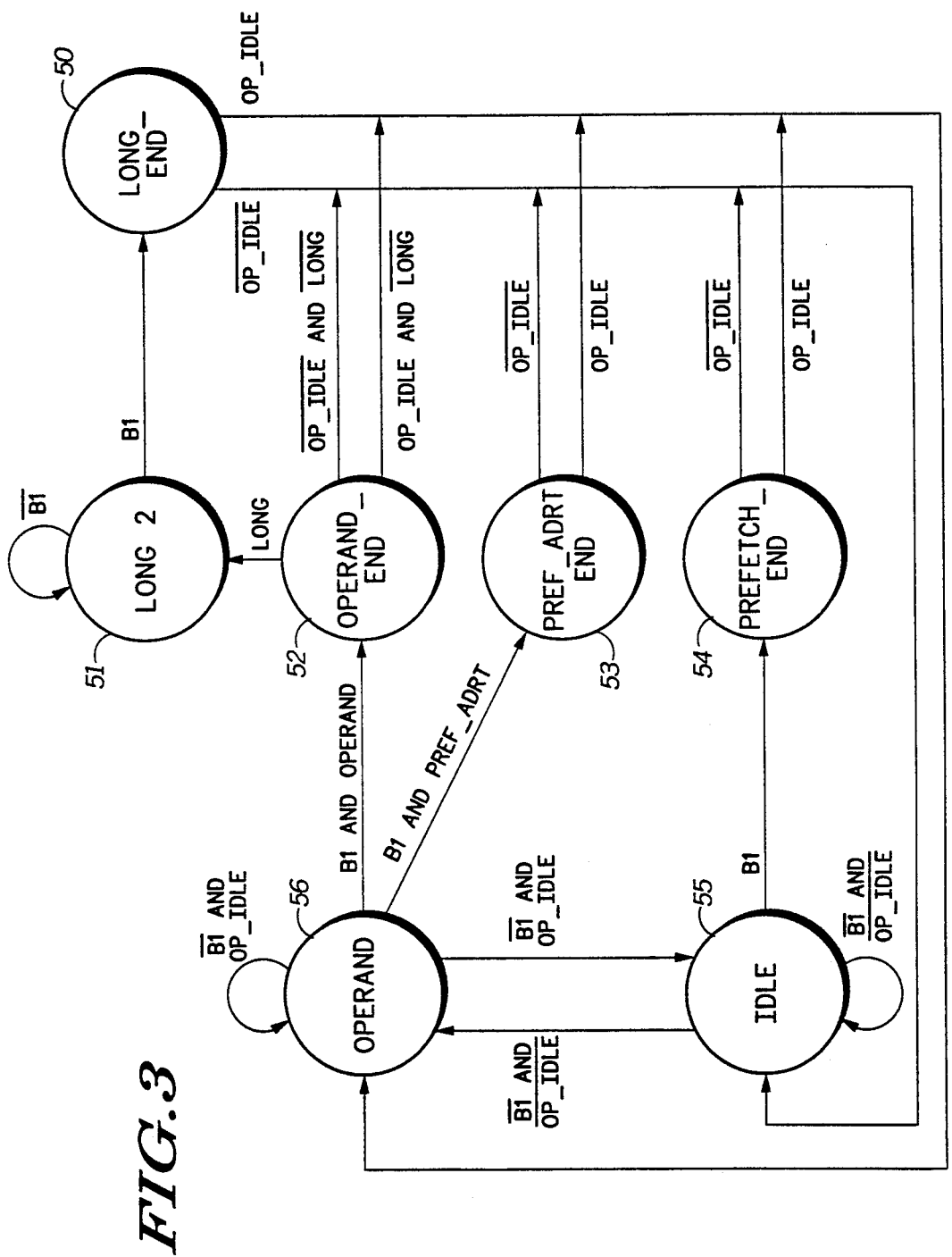
FIG. 3 is a state diagram of the cycle scheduler state machine forming part of the cycle scheduler of the bus controller of FIG. 2.

The cycle scheduler 42 controls portions of the address/data interface unit 34 and sets up the next bus cycle to be run. This includes setting up the address and associated bus cycle information (such as function codes, size and read/write), generating the address for the second bus cycle of a long word transfer, and incrementing the address for prefetch bus cycles. The cycle scheduler 42 also signals the pipe to flush when a branch occurs. FIG. 3 shows the state diagram of the cycle scheduler 42. The states of the cycle scheduler 42—IDLE 55, OPERAND 56, LONG_2 51, PREFETCH_END 54, PREFADRT_END 53, LONG_END 50, and OPERAND_END 52, and the activities associated with each state are described below.

IDLE 55: This is the default state when no operands are enqueued or are within a clock of being enqueued. The program counter (PC) is transferred to the address output buffer (AOB) during PHI1, setting up a prefetch bus cycle. If a prefetch is requested during PHI1 the cycle may start PHI2. If the cycle starts, then the next state is PREFETCH_END 54. If the cycle does not start then the OP_IDLE signal determines whether the next state is OPERAND 56 or IDLE 55.

OPERAND 56: This is the default state when an operand is enqueued or is within a clock of being enqueued. The operand address is transferred to AOB during PHI1, setting up an operand bus cycle. When the cycle is enqueued during PHI1, then it may start PHI2. If the cycle starts, then the next state is OPERAND_END 52 for an operand, or PREFADRT_END 53 for a branch. If the cycle does not start then the OP_IDLE signal determines whether the next state is OPERAND 56 or IDLE 55. An example of the OPERAND 56 state going to the IDLE 55 state is when an operand is one clock away, but the microsequencer 22 is stopped waiting for a prefetch. The prefetch must be run before the operand will actually be enqueued.

LONG_2 51: This state initiates the bus cycle for the second word of a long operand. The address of the first word has been incremented by 2 and is transferred to AOB during PHI1, the cycle may start PHI2. The next state is LONG_END 50.

PREFETCH_END 54 and PREFADRT_END 53: The adder has incremented the prefetch address by 2 and during these states that incremented value is transferred to PC. The OP_IDLE signal determines whether the next state is OPERAND 56 or IDLE 55.

OPERAND_END 52: This state transfers the operand address to a temporary fault address register. This register provides the fault address for stacking in case of a bus error exception. The OP_IDLE signal determines whether the next state is OPERAND 56 or IDLE 55.

LONG_END: This state transfers the address of the second word of the long operand to the fault address register. The OP_IDLE signal determines whether the next state is OPERAND 56 or IDLE 55.

The cycle scheduler requests that a bus cycle be run during the LONG_2 state, the OPERAND state when a cycle has been enqueued, or IDLE state when a prefetch is being requested by the pipe. This "bus cycle to be run request" (or the "cycle pending" information) is signaled to the bus cycle sequencer which in turn starts the bus cycle.

Figure 4:
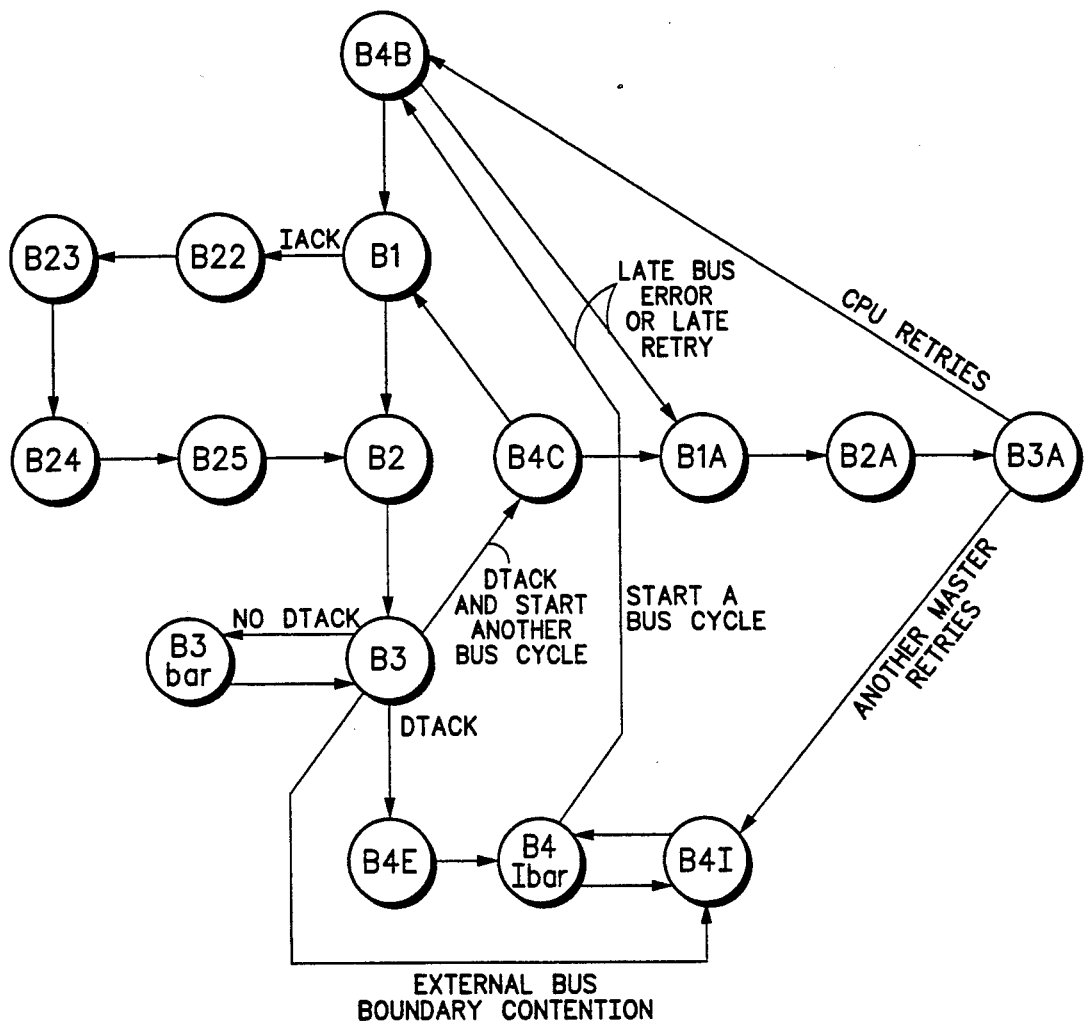
FIG. 4 is a state diagram of the bus cycle sequencer state machine forming part of the bus cycle sequencer of FIG. 2.

The bus cycle sequencer controls the actual sequencing of the bus cycle. This primarily involves sequencing through the various states associated with the synchronous bus cycle, and directing the assertion of various bus signals as needed. This includes directing when to drive the address, size, read/write, and function codes, and directing when to drive or latch the data. The bus cycle sequencer state diagram is shown in FIG. 4 with state transitions occurring every PHI and PHI2 (with the corresponding even numbered states being active during PHI2, and the corresponding odd numbered states being active during PHI1). As an example, a typical 2-clock bus cycle would sequence through states B4B—B1—B2—B3—B4E. During state B3 the slave device (i.e. memory or peripheral) signals the valid transfer of data and the cycle is concluded. If the slave device requires more time to complete the transfer it will not signal the valid transfer of data and the bus cycle is extended a clock at a time by the insertion of a B3bar wait state which cycles back to state B3. When the slave device is ready, it will signal the valid transfer of data during a state B3 and the the cycle will conclude. A typical 4-clock bus cycle (one that has been extended two clocks) would sequence through states B4B—B1—B2—B3—B3bar—B3—B3bar—B3—B4E.

Further information on the general design of a bus controller is given in the following U.S. Pat. No. 4,763,253 "Microcomputer with Change of Flow" by Bluhm et al., U.S. Pat. No. 4,729,093 "Microcomputer which Prioritizes Instruction Prefetch Requests and Data Operation Requests", by Mothersole et al., and U.S. Pat. No. 4,633,437 "Data Processor having Dynamic Bus Sizing" by Mothersole et al., all of which are incorporated herein by reference.

Figure 5:
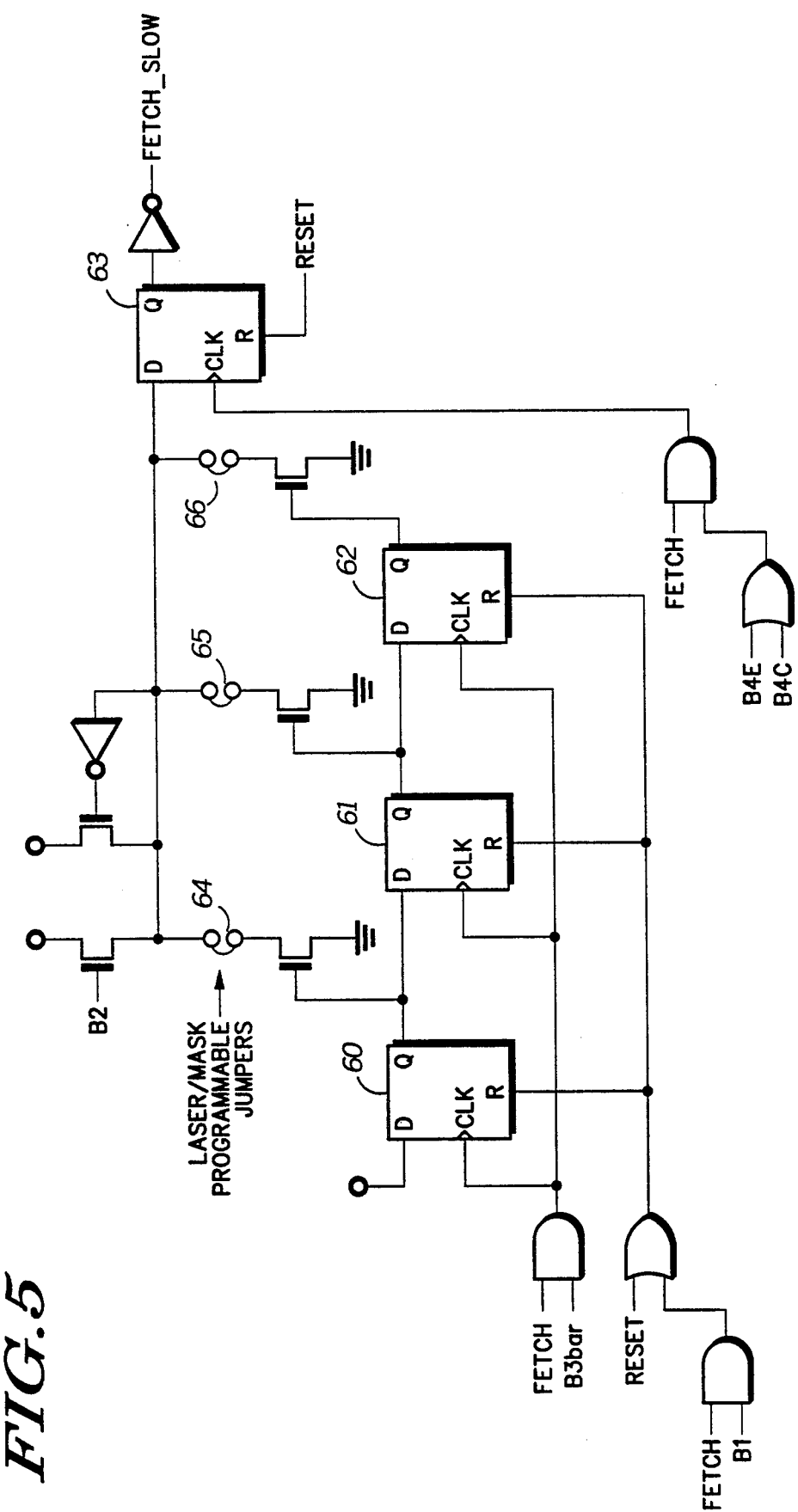
FIG. 5 is a diagram of a circuit for implementing a prefetch bus speed counter forming part of the bus cycle sequencer of the bus controller of FIG. 2.

A part of the bus cycle sequencer 44 is the prefetch speed counter, which is used to determine the speed of the previous prefetch. Shown in FIG. 5 is a schematic diagram of the the prefetch speed counter of the preferred embodiment. The prefetch speed counter is comprised of a three-bit shift register 60,61,62, a latch 63, and programmable selection jumpers 64,65,66. The three-bit shift register 60,61,62 is cleared at the beginning of each bus cycle, and a logic high is shifted in each time the bus cycle sequencer 44 enters its the B3bar wait state. This acts as a bus speed counter in that for each wait state, a logic high propagates to the next higher stage of the shift register. Therefore at the conclusion of a prefetch the shift register holds a representation of the speed of the bus cycle as shown in table 2 below.

TABLE 2

| Bus Cycle Speed | Shifter Results |
| --- | --- |
| 2-clocks | 0 0 0 |
| 3-clocks | 0 0 1 |
| 4-clocks | 0 1 1 |
| 5-clocks or greater | 1 1 1 |

Note that each stage of the shift register can be equated to a particular time threshold. For example the first stage 60 becomes a logic one only if the bus cycle speed is longer than 2-clocks, the second stage 61 becomes a logic one only if the bus cycle speed is longer than 3-clocks, and the third stage 62 becomes a logic one only if the bus cycle is longer than 4-clocks. This fact is used to simplify the implementation of the invention. At the conclusion of each prefetch bus cycle, one of the selected threshold values is latched to represent the bus cycle speed of the most recent prefetch. This selection is accomplished by the use of a mask or laser programmable jumper and allows the threshold to be changed. The programmable jumper is implemented in a precharge/discharge fashion so that successively removing jumpers, starting with the first jumper 64, selects successively longer bus speed threshold. The appropriate threshold will depend upon the processor and microcode implementation. Thus, the programmability allows tweaking of the threshold as design modifications are made. The present implementation has the threshold selected for cycles longer than 2-clocks. The output of the latch 63 is referred to as the FETCH_SLOW signal, and when asserted signifies that the most recent prefetch was slower than the selected threshold limit.

The instruction pipe 24, as is conventional, is used to store instructions which are to be sequentially used. It holds up to three prefetched instruction words and provides them to the microsequencer 22 as needed. The instruction pipe 24 (pipe), under the direction of the pipe controller 26, provides instructions to the microsequencer 22 in a first-in first-out (FIFO) like manner with the added ability to provide words out of the middle of the pipe 24 as needed. The final stage of the pipe typically holds the first word of the instruction, and the preceding two stages contain any extension words or succeeding instructions. Extension words are accessed from the middle of the pipe without affecting the final stage. After the instruction words have been accessed, the microsequencer 22 will direct that certain used instruction words in the pipe 24 be invalidated, and cause subsequent words to shift in. As the instruction words are used, the pipe controller 26 attempts to refill the pipe by requesting a that the bus controller 30 run prefetches. The pipe controller 26 can request that the bus controller 30 continually prefetch instructions, prefetch one word, or prefetch none at all. As instruction words are invalidated and other words are prefetched, the pipe controller 26 keeps track of the fullness state of the pipe 24, and of how many extension words have been used by an instruction. This in combination with knowing how many extension words were required by the instruction, allows the pipe controller 26 to determine how many extension words are still needed and whether have already been, or need to be prefetched. The pipe controller 26 also observes when a new instruction decode is being requested by the microsequencer 22 so as to detect when a branch has fallen through. When a branch is taken, the bus controller intiates prefetching the first word of the branch destination and informs the pipe that a flush should occur. A flush causes the previously prefetched instruction words in the pipe to be invalidated.

Of special significance is the anticipated branch information provided to the pipe controller 26 by the microsequencer 22. This branch information, provided by the instruction decode, specifies at the earliest possible time that a branch instruction is imminent, and how many instruction words should be fetched to complete the instruction. Instructions can be comprised of multiple instruction words. Those words beyond the first are referred to as extension words. The prefetching for a branch instruction should not be stopped until all its extension words have been prefetched. The following table 3 shows the information provided by the microsequencer 22 for various instructions. Within this particular embodiment certain tradeoffs have been made with regard to the implementation of the microsequencer 22. This limits branch information to four categories. As a result the Bcc.B instruction which in reality has no extension words is placed in the "1 extension word category" so that the FETCH_SLOW signal more appropriately affects the instruction's prefetch requests. The more advantageous solution would be to further subdivide the categories into the conditional and unconditional branches.

TABLE 3

0 Extension words required for

Exceptions (A special, non-instruction, branch case)
Instructions which Alter the Status Register
TRAP - Trap Instruction
BRA.B - Unconditional Branch with Byte Displacement
BSR.B - Branch Subroutine with Byte Displacement
RTS - Return from Subroutine
RTE - Return from Exception
RTR - Return and restore condition codes
JSR - Jump Subroutine (After Effective Address Calculation)
JMP - Jump (After Effective Address Calculation)
1 Extension Word Required Bcc.B - Conditional Branch with Byte Displacement
BRA.W - Unconditional Branch With word displacement
Bcc.W - Conditional Branch with Byte Displacement
BSR.W - Branch Subroutine with Word Displacement
DBcc - Decrement and Branch (Untill Loop Mode is Entered)
RTD - Return and Deallocate
LPSTOP - Low Power Stop
2 Extension Words Required BRA.L - Branch with a Long Displacement
Bcc.L - Conditional Branch with a Long Displacement
BSR.L - Branch Subroutine with Long Displacement
Many Words Required DBcc - Decrement and Branch (While in Loop Mode)
All Other Instructions nit listed above Note that for this particular embodiment, the majority of change of flow instructions utilize a simple effective address calculation using 0, 1, or 2 additional extension words following the first instruction word. The microcode for these instructions inherently include the sequences for calculating the effective address (EA). As a result, prefetch requirement information for these instructions can be provided by the initial instruction decode of microsequencer 22. The JSR and JMP instructions though, support a variety of EA types and thus for microcode savings use EA routines which are shared with other instructions. As a result, the initial instruction decode initiates a common EA microcode sequence which specifies prefetch requirement information as "many words required", which is the appropriate information for the majority of instructions that would use these routines. Subsequent instruction decode initiates the JSR or JMP specific microcode and this decode changes the prefetch requirement information to the "0 extension words required".

The pipe controller uses this branch information, the FETCH_SLOW signal, and the fullness of the instruction pipe to determine the number of fetches to request of the bus controller 30. The following pseudocode shows the implementation for determining the number of words to prefetch.

```
IF (exception) THEN-REQUEST no words be fetched
ELSE-IF (not fetch_slow) THEN - implying a fast bus
    IF (pipe is full) THEN-
        REQUEST 0 words to be fetched
    ELSE-IF (0 extension words required) THEN-
        REQUEST no words be fetched
    ELSE-IF (pipe needs 1 more word to be full) THEN-
        REQUEST 1 word be fetched
    ELSE-REQUEST continuous fetching -
    implying the pipe need more than 1 word to be full
ELSE - implying a slow bus
    IF (Many extension words still needed) THEN
        IF (pipe is full) THEN-
            REQUEST no words be fetched
        ELSE-IF (pipe needs 1 more word to be full) THEN-
            REQUEST 1 word be fetched
        ELSE-REQUEST continuous fetching -
        implying the pipe needs more than 1 word to be full
    ELSE-IF (0 extension words still needed) THEN
        IF (a new instruction decode is being requested) THEN -
        implies that branch has concluded
            IF (pipe needs more than 1 word to be full) THEN-
                REQUEST continuous fetching
            ELSE-IF (pipe needs 1 more word to be full) THEN-
                REQUEST 1 word be fetched
            ELSE-REQUEST no words be fetched -
            implying pipe is full
        ELSE-REQUEST no words be fetched -
        implying that the branch has not concluded
    ELSE-IF (1 extension word still needed) THEN
        IF (pipe is full) THEN-
            REQUEST no words be fetched
        ELSE-IF (a new instruction decode is being
        requested) THEN - implying the branch has concluded
            IF (pipe needs 1 more word to be full) THEN-
                REQUEST 1 word be fetched
            ELSE-REQUEST continuous fetching -
            implying pipe needs more than one word to be full
        ELSE-IF (pipe needs more than 1 word to be full) THEN-
            REQUEST 1 word be fetched
        ELSE-REQUEST no words to be fetched
    ELSE - implying 2 extension words still needed
        IF (pipe is full) THEN-
            REQUEST no words to be fetched
        ELSE-IF (a new instruction decode is being
        requested) THEN - implying the branch has concluded
            IF (pipe needs 1 more word to be full) THEN-
                REQUEST 1 word to be fetched
            ELSE-REQUEST continuous fetching -
            implying pipe needs more than 1 word to be full
        ELSE-IF (pipe needs more than 1 word to be full) THEN-
            REQUEST continuous fetching
        ELSE-REQUEST 1 word be fetched -
        implying pipe needs 1 more word to be full
```

This scheme provides that when a branch occurs on a fast bus, additional prefetches past the branch are allowed. These prefetches are anticipated to be fast enough that they will not impede the start of a branch taken prefetch should it occur. On a slow bus the prefetches are held off until the branch condition is resolved. This trades off the time required to resolve the branch against the relatively long time required to complete a potentially unnecessary prefetch.

Several apparent modifications that could be to the preferred embodiment which are within the scope of this invention. Such modifications include;

1) Implementing a different form of counter.
2) Different prefetch cases being effected by different bus speed thresholds (i.e. one type of prefetch would alter its prefetch strategy at a 2-clock threshold, while a different type of prefetch would alter its prefetch strategy at a 3-clock threshold).
3) Using an averaged speed or weighted averaged speed of multiple bus cycles as a bus speed indicator.
4) Using the bus speed indication to effect operand scheduling.
5) Using the bus speed to control cache loading or write back strategies. For example, when external memory accesses can approach cache speed, it is more advantageous not to cache the fast bus cycles but to cache other bus cycles that are comparatively slower.
6) Using the bus speed information to regulate buffer filling (i.e. a DMA driven serial communications device could use the bus speed information to more accurately regulate a buffer filling and emptying). As serial information fills the buffer, the device could anticipate the time required to DMA transfer the buffer's contents to memory and could regulate the transfer appropriately to prevent buffer overflow.).

While the present invention has been shown and described with reference to a particular embodiment thereof, various modifications and changes thereto will be apparent to those skilled in the art and are within the spirit and scope of the present invention.

We claim:

1. A digital computing system comprising:
    instruction execution and sequencing means for executing each of a plurality of instructions and for determining a sequence of instruction execution, the instruction execution and sequencing means further comprising:
        i) instruction pipe means for storing a plurality of instructions;
        ii) pipe controller means coupled to the instruction pipe means for monitoring the instruction pipe means and for providing prefetch request signals; and
        iii) operand request means for providing operand read/write request signals;
    bus controller means coupled to the instruction execution and sequencing means for receiving the prefetch request signals and the operand read/write request signals and for operating a communication bus to perform prefetch bus cycles and operand read/write bus cycles, the bus controller means further comprising:
        i) bus cycle scheduler means for determining whether to commence a prefetch bus cycle, commence an operand read/write bus cycle or to commence no bus cycle;
    wherein the improvement comprises:
        the bus controller further comprises bus speed determination means for determining a time required to complete a previously completed bus cycle and for providing a bus speed signal; and the pipe controller means is coupled to the bus speed determination means to receive the bus speed signal and is for determining whether to provide the prefetch request signal based on a value of the bus,speed signal.

2. A digital computing system according to claim 1 Wherein the bus speed determination means determines a time required to complete a most recently completed prefetch bus cycle.

3. A digital computing system according to claim 1 wherein the pipe controller means is for determining whether a change of flow instruction is presently being executed by the instruction execution and sequencing means and is for determining whether to provide the prefetch request signal based on a value of the bus speed signal and based on whether a change of flow instruction is presently being executed by the instruction execution and sequencing means.

* * * * *